April 16, 1929.　　J. W. VANDERVEER　　1,709,696
VEHICLE WHEEL
Filed June 4, 1926
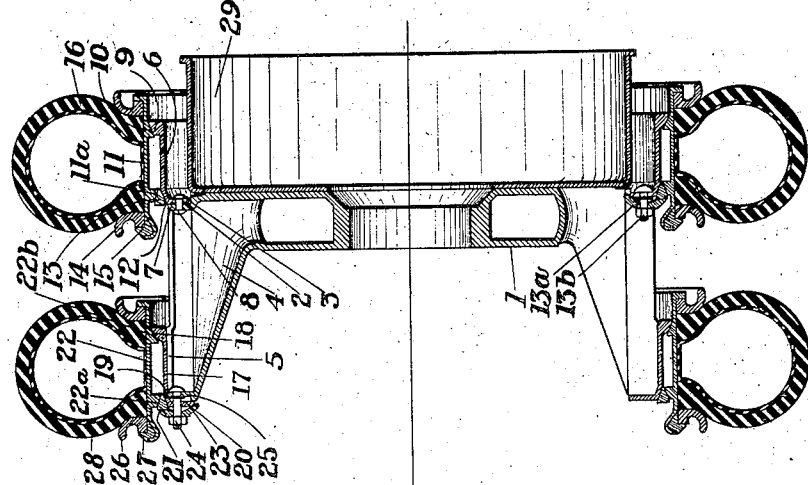
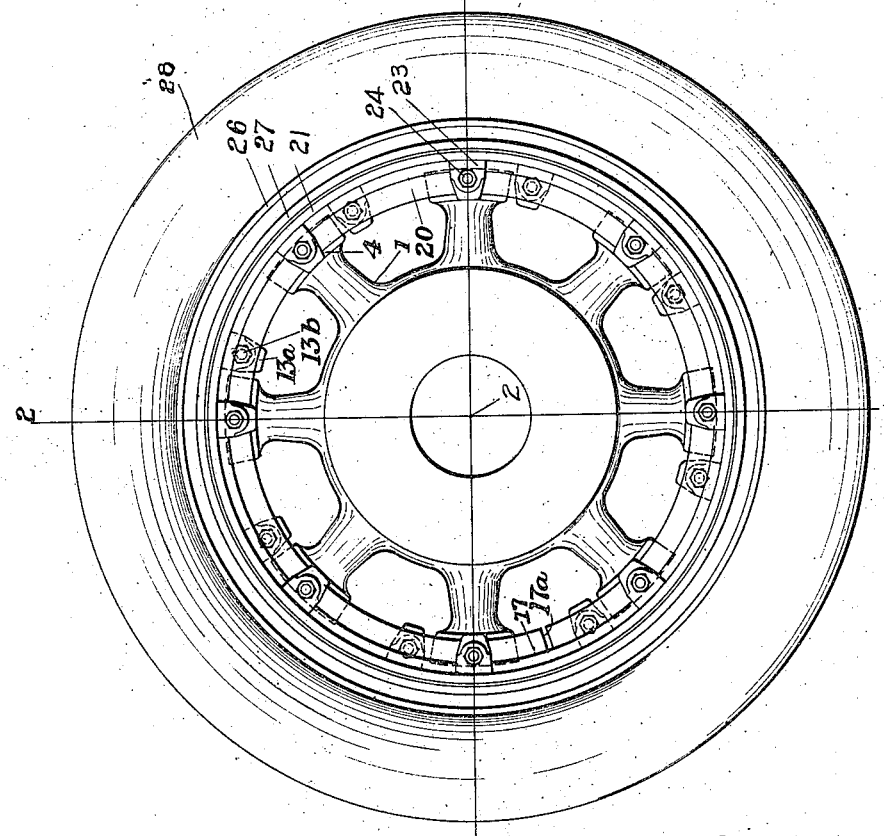
Jewell W. Vanderveer
INVENTOR.
BY
ATTORNEYS.

Patented Apr. 16, 1929.

1,709,696

UNITED STATES PATENT OFFICE.

JEWELL W. VANDERVEER, OF ERIE, PENNSYLVANIA, ASSIGNOR TO VAN WHEEL CORPORATION, OF ONEIDA, NEW YORK, A CORPORATION OF NEW YORK.

VEHICLE WHEEL.

Application filed June 4, 1926. Serial No. 113,609.

This invention is designed to improve metal wheels, particularly such wheels as are designed to carry two tires. With the present use of large section tires and the desirability of using large brake drums in connection with the large surfaces engaged by the double tires difficulty is encountered in providing sufficient space between the brake drum and the tire mounting to avoid the heating of the tire mounting so as to injure the tires. The present invention is designed to obviate this difficulty and to afford a simple and convenient means for demountably arranging the tire rims on the wheel.

The invention is illustrated in the accompanying drawings as follows:—

Fig. 1 shows a front elevation of the wheel.

Fig. 2 a section on the line 2—2 in Fig. 1.

1 marks the spokes. The spokes are faced on their inner edges and outer ends at 2 and the faces terminate in shoulders 3. The spokes also have the outward axially extending projections 4 having seating surfaces 5 on their outer faces.

A rim-supporting felloe 6 has an inwardly extending flange 7 which seats on the seating face 2 and is riveted and secured to this face by means of rivets 8. The inner edge of the flange seats on the shoulder 3. A tapered shoulder 9 is arranged at the inner edge of the felloe and is adapted to receive a tapered shoulder 10 of a demountable rim 11. The felloe at its forward edge has a tapered surface 12 which engages a wedge-shaped ring 13. The ring 13 engages a tapered shoulder 11$^a$ on the rim and is forced into position by clamping plates 13$^a$ which are secured by bolts 13$^b$ extending through the flange 7 and plates 13$^a$, the plates being slightly off-set from the spokes as shown in Fig. 1, thus exposing the bolts so that the plates may be readily removed for removing the rim. The rim has the usual removable rings 14 and a locking ring 15 securing the inner tire 16.

A rim support 17 is mounted on the seating surfaces 5. This is an exact counterpart of the felloe 6 except it is split at 17$^a$. It is provided with the tapered surfaces 18 and 19 corresponding to the tapered surfaces 9 and 12. It is also provided with a downwardly extending flange 20 extending along the front faces of the projections 4. A wedge ring 21 operates on the tapered surface 19 and engages a tapered shoulder 22$^a$ of a rim 22. The rim is provided with a tapered shoulder 22$^b$ engaging the tapered surface 18. Clamping plates 23 have their upper edges in engagement with the wedge ring 21 and their lower edges in engagement with the flange 20. Bolts 24 extend through webs 25 in the ends of the projections 4, the flange 20 and the plates 24. The tightening of these bolts locks the rim support 17 and the wedge rings in place. The fact that the rim 17 is made contractible by means of the break at 17$^a$ permits of its being drawn down into close contact through the wedging action of the rim on the bevelled surface 18 and the ring 21 on the bevelled surface 19. When the bolts 24 are tightened the entire assembly is rigidly connected and any inequality that may exist in the dimensions is taken care of. The rim is provided with the usual removable sides 26 with the locking ring 27 and the outer tire 28 is mounted on the rim 22.

A brake band 29 is secured to the inner faces of the spokes. Heretofore it has been attempted to form the inner extending felloe 6 in a casting integral with the spokes but the method required of such construction and the shape necessary to make it contractible brings the felloe into such close proximity to the brake band as to result in the overheating of the tire supporting surfaces so as to injure the tires. With the present construction this difficulty can be obviated in that the wrought metal with its flange construction readily clears the brake drum with sufficient space to afford cooling and at the same time gives sufficient strength. Further the rolling of the wrought band affords a cheaper plan of construction than where it is attempted to cast the entire felloe with the spokes. The rim support at the outer end of the projection may be made a complete counterpart of the felloe at the inner end, thus reducing the number of differing parts.

When it is desired to remove the rear tire the front rim support 17 is removed with the front tire thus giving clearance so that the rear rim may be readily removed over the projections by loosening the plates 13$^a$.

What I claim as new is:—

1. In a wheel, the combination of a wheel center having spokes; a rear fixed felloe of angle section, one flange thereof being vertical and secured to the spokes and the other flange horizontal and extending rearwardly from the spokes, said horizontal flange having a beveled seat thereon; a rear demountable rim on said seat; clamping means clamping said rim on said seat comprising bolts secured on said vertical flange and between the spokes; a removable front felloe of the same cross section as the rear felloe and having its horizontal flange seating on the ends of its spokes and its vertical flange facing the front of the spokes; a front rim mounted on the seat of said front felloe; and clamping means clamping the front rim on the front felloe and securing the front felloe on the wheel, the removal of the front felloe exposing the clamping means for the rear rim.

2. In a wheel, the combination of a wheel center having spokes; a rear fixed felloe of angle section, one flange thereof being vertical and secured to the spokes and the other flange horizontal and extending rearwardly from the spokes, said horizontal flange having a beveled seat thereon; a rear demountable rim on said seat; clamping means clamping said rim on said seat comprising bolts secured on said vertical flange and between the spokes; a removable front felloe of the same cross section as the rear felloe and having its horizontal flange seating on the ends of its spokes and its vertical flange facing the front of the spokes, said front felloe being split transversely; a front rim mounted on the seat of the front felloe; and clamping means clamping the front rim on the front felloe and clamping the front felloe on the ends of the spokes, the removal of the front felloe exposing the clamping means for the rear rim.

3. In a wheel, the combination of a wheel center with extending spokes; a rear demountable rim mounted at the rear of said spokes; means for clamping said rim in place; a removable felloe mounted on the ends of said spokes at the front of the wheel, said felloe being split transversely; stop means acting on the felloe and spoke definitely aligning the felloe with a plane at right angles to the axis of the wheel; a front demountable rim on said felloe; and means clamping the rim on the felloe and clamping the felloe on the ends of the spokes.

4. In a wheel, the combination of a wheel center with extending spokes; a rear demountable rim mounted at the rear of said spokes; means for clamping said rim in place; a removable felloe mounted on the ends of said spokes at the front of the wheel, said felloe being split transversely and said demountable felloe having a beveled seat; stop means acting on the felloe and spoke definitely aligning the felloe with a plane at right angles to the axis of the wheel; a front demountable rim on said seat; and common means clamping the rim on the beveled seat and clamping the felloe on the ends of the spokes.

5. In a wheel, the combination of a wheel center with extending spokes; a rear demountable rim mounted at the rear of said spokes; means for clamping said rim in place; a removable felloe of angle cross section having a horizontal flange seating on the ends of the spokes at the front of the wheel and a vertical flange facing the spokes at the front of the wheel, said felloe being split transversely and having a beveled seat; a front rim having a beveled surface mounted on said seat; and means for clamping the rim and felloe in place.

6. In a vehicle wheel, the combination of a wheel center having spokes; a beveled rear rim seat; a rear demountable rim on said seat; clamp supporting plates extending circumferentially from the spokes along the rear rim; a front demountable rim mounted at the front of said spokes; clamps on the plates between the spokes operating on the rear rim and clamping it to its seat; and means securing the front rim in place, the removal of the front rim and means leaving the space between the spokes in front of the clamps unobstructed.

7. In a vehicle wheel, the combination of a wheel center having spokes; a beveled rear rim seat; a rear demountable rim on said seat; clamp supporting plates extending circumferentially from the spokes along the rear rim; a front demountable rim mounted at the front of said spokes; a removable felloe on which the front rim is mounted; clamps on the plates between the spokes operating on the rear rim and clamping it to its seat; and means securing the front rim and felloe in place, the removal of the front rim and felloe leaving the space between the spokes in front of the clamps unobstructed.

8. In a vehicle wheel, the combination of a wheel center having spokes; a band at the rear of the ends of the spokes; a beveled rear rim seat on the band; a rear demountable rim on said seat; a front demountable rim mounted at the front of said spokes; clamps on the band between the spokes operating on the rear rim and clamping it to its seat; means securing the front rim in place, the removal of the front rim and means leaving the space between the spokes in front of the clamps unobstructed.

In testimony whereof I have hereunto set my hand.

JEWELL W. VANDERVEER.